(12) United States Patent
Umeda et al.

(10) Patent No.: US 8,218,149 B2
(45) Date of Patent: Jul. 10, 2012

(54) OBJECT DETECTING DEVICE AND INFORMATION ACQUIRING DEVICE

(75) Inventors: Katsumi Umeda, Ogaki (JP); Nobuo Iwatsuki, Anpachi-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/109,531

(22) Filed: May 17, 2011

(65) Prior Publication Data

US 2011/0222064 A1    Sep. 15, 2011

Related U.S. Application Data

(63) Continuation of application No. PCT/JP2009/067777, filed on Oct. 14, 2009.

(30) Foreign Application Priority Data

Nov. 21, 2008   (JP) ................................. 2008-298575

(51) Int. Cl.
*G01N 21/55* (2006.01)
(52) U.S. Cl. ...................................... 356/445
(58) Field of Classification Search .................. 356/445, 356/448
See application file for complete search history.

(56) References Cited

U.S. PATENT DOCUMENTS

| | | | |
|---|---|---|---|
| 5,214,494 A | 5/1993 | Inaba et al. | |
| 5,646,399 A | 7/1997 | Fukushima et al. | |
| 7,773,172 B2 * | 8/2010 | Svec et al. | 349/62 |

FOREIGN PATENT DOCUMENTS

| | | | |
|---|---|---|---|
| JP | 62-103587 A | | 5/1987 |
| JP | 62103587 A | * | 5/1987 |
| JP | 1-116617 A | | 5/1989 |
| JP | 4-113235 A | | 4/1992 |
| JP | 5-5805 A | | 1/1993 |
| JP | 9-61732 A | | 3/1997 |
| JP | 2001-317938 A | | 11/2001 |
| JP | 2007-85832 A | | 4/2007 |
| JP | 2008-70157 A | | 3/2008 |
| WO | WO 2010/058667 A1 | | 5/2010 |

OTHER PUBLICATIONS

International Preliminary Report on Patentability for PCT/JP2009/067777, Jun. 3, 2011, pp. 1-6.
Translation of International Preliminary Report on Patentability for PCT/JP2009/067777, Jun. 30, 2011, pp. 1-7.
International Search Report for PCT/JP2009/067777, dated Nov. 17, 2009, pp. 1-5.

* cited by examiner

*Primary Examiner* — Roy M Punnoose
(74) *Attorney, Agent, or Firm* — Ditthavong Mori & Steiner, P.C.

(57) ABSTRACT

An information acquiring device includes a laser light source which emits light in a predetermined wavelength region; a projection lens which projects the light from the laser light source toward a targeted area; an image sensor which receives reflected light reflected from the targeted area to output a signal; and an imaging lens which guides the reflected light to the image sensor; a filter which transmits the light from the laser light source; and an actuator which inclines the filter. A filter controlling circuit inclines the filter in such a direction as to approximate a transmissive wavelength region of the filter to the wavelength region of the light from the laser light source.

6 Claims, 17 Drawing Sheets

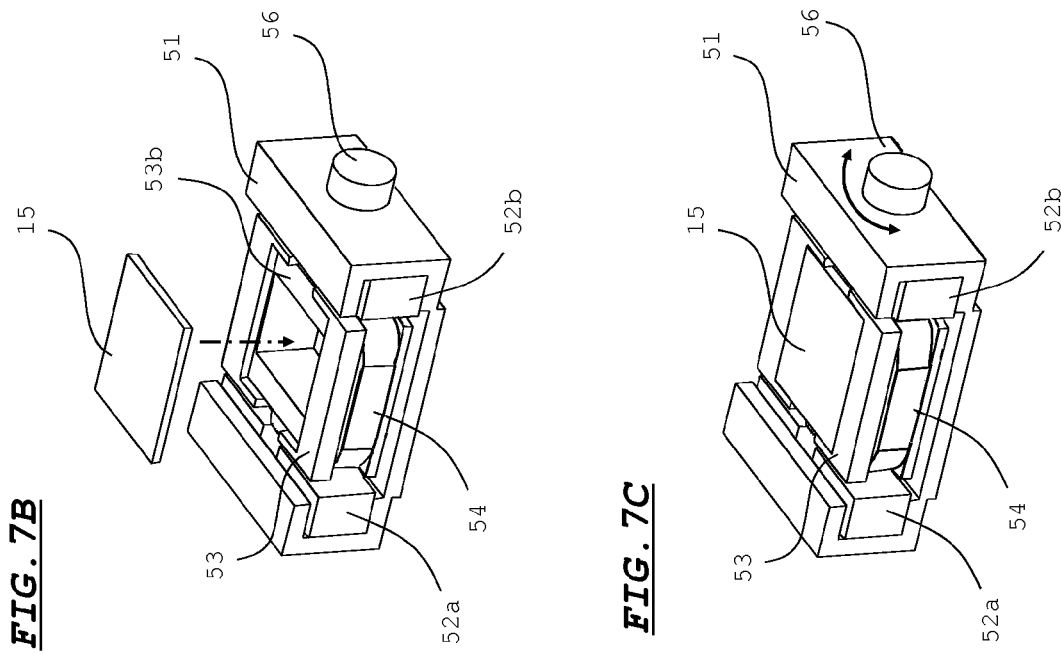
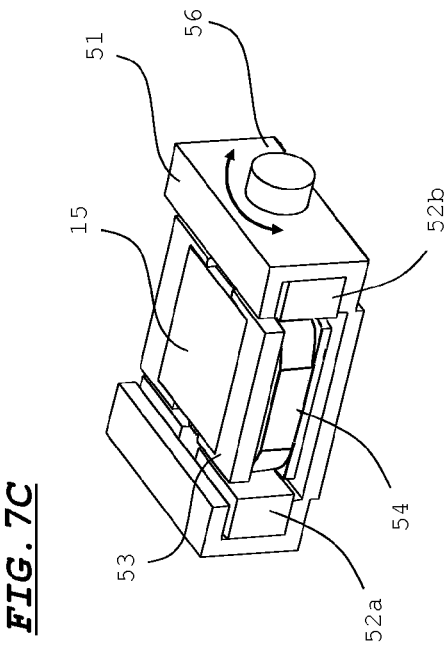
FIG. 7A
FIG. 7B
FIG. 7C

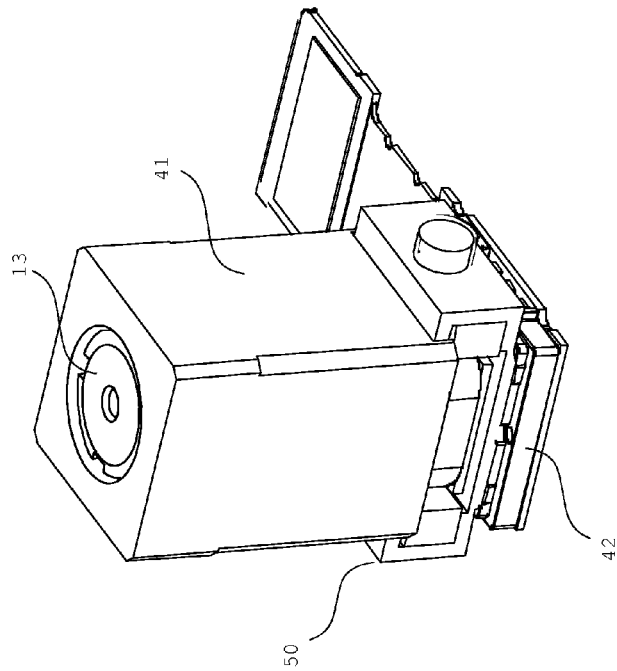
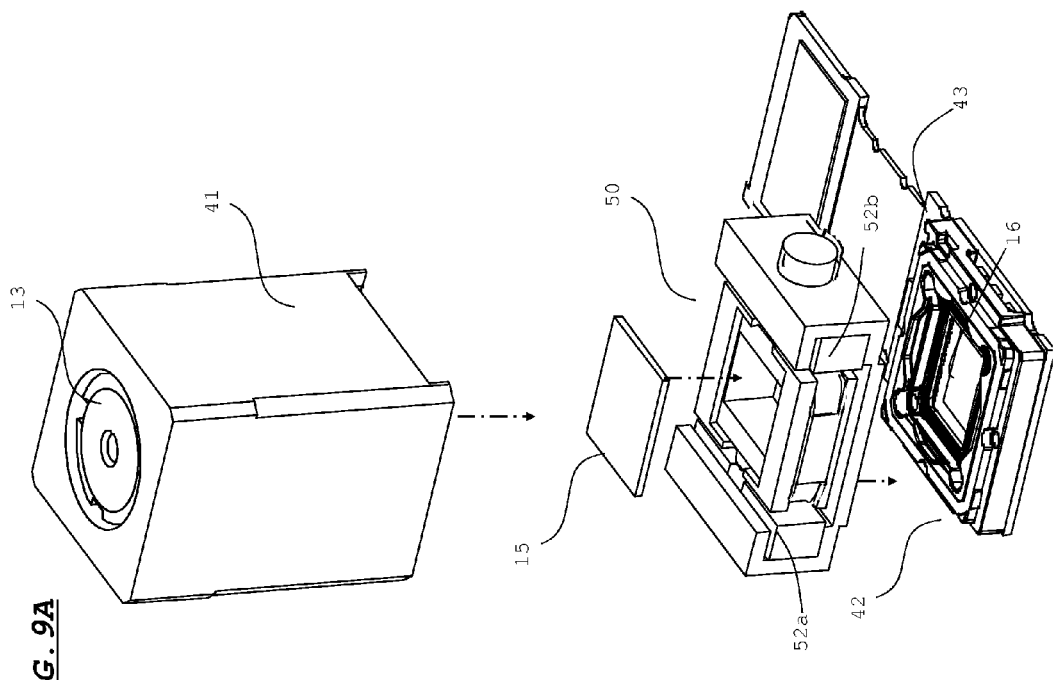
FIG. 9A
FIG. 9B

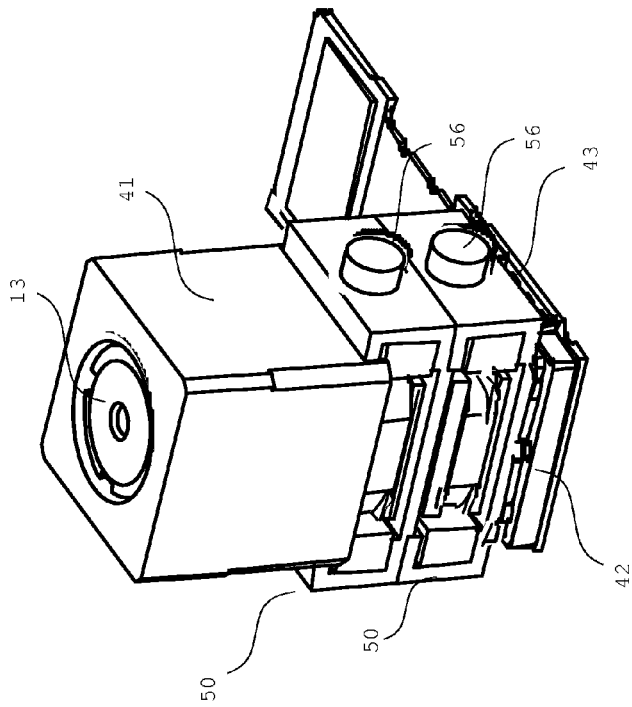
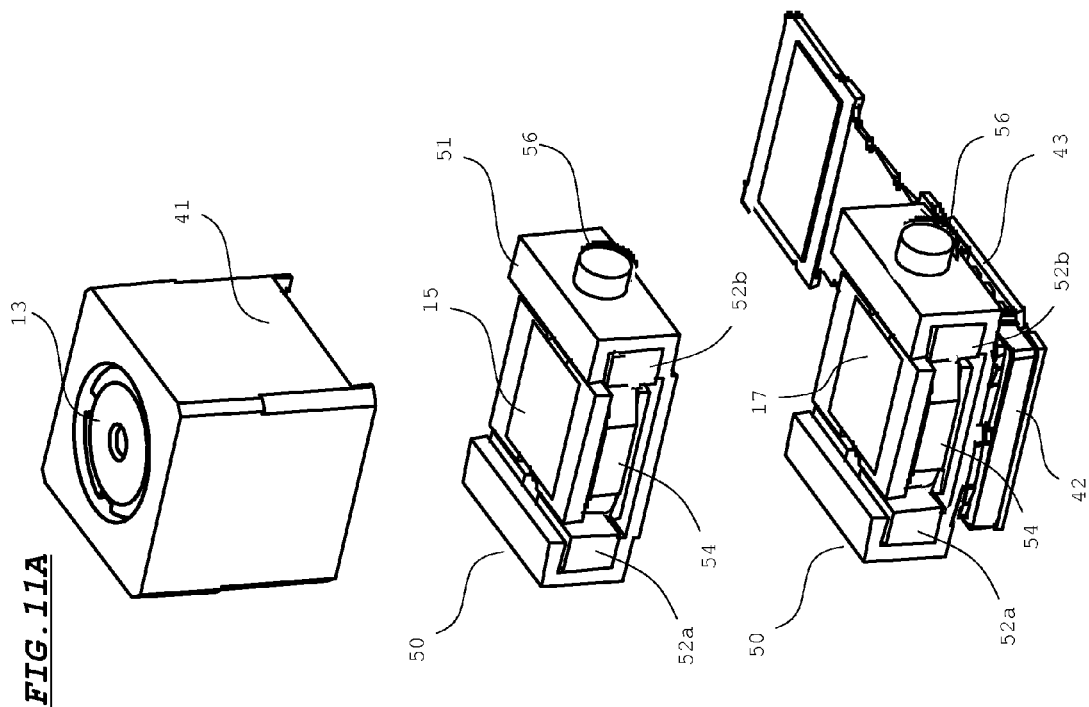
FIG. 11A
FIG. 11B

OBJECT DETECTING DEVICE AND INFORMATION ACQUIRING DEVICE

This application is a Continuation of PCT/JP2009/067777 filed Oct. 14, 2009 and claims priority under 35 U.S.C. Section 119 of Japanese Patent Application No. 2008-298575 filed on Nov. 21, 2008, entitled "OBJECT DETECTING DEVICE AND INFORMATION ACQUIRING DEVICE." The disclosure of the above application is incorporated herein by reference.

BACKGROUND OF THE INVENTION

1. Field of the Invention

The present invention relates to an object detecting device for detecting an object in a targeted area based on a state of reflected light when light is projected onto the targeted area, and an information acquiring device incorporated with the object detecting device.

2. Disclosure of Related Art

Conventionally, there has been developed an object detecting device using light in various fields. For instance, in a laser radar system to be loaded in a vehicle, laser light is projected in the forward direction of the vehicle to determine whether an object exists in the forward direction of the vehicle based on presence or absence of reflected light at the light projection. Further, a distance to the object is detected, based on a timing at which laser light is projected and a timing at which reflected light is received. In addition to the above, an object detecting device using infrared light is loaded in an arcade game machine, a security system, or a like device to detect presence or absence of e.g. a person or a gesture thereof.

In such an object detecting device, light in a predetermined wavelength region is projected from a laser light source or a Light Emitting Diode (LED) to a targeted area. In this case, precision of object detection is enhanced by disposing a filter for guiding only light in the predetermined wavelength region to a light receiving element such as a Position Sensitive Detector (PSD) or a CMOS image sensor.

In particular, in the case where the object detecting device is used outdoors, detection precision may be degraded due to sunlight. FIG. 17 is a diagram showing a frequency spectrum of sunlight. About 40% of sunlight on the ground lies in a infrared wavelength region. Therefore, it is required to properly block the sunlight, in the case where infrared light is used for object detection.

In the above case, for instance, a laser light source for emitting light in a narrow wavelength region may be used as a light source, and a narrow wavelength filter having the wavelength region of the laser light source as a transmission region may be used. Even with use of the above members, since the emission wavelength region has a tolerance in each laser light source, it is not impossible to completely coincide the transmission region of the filter with the transmission region of the laser light source. Further, since the emission wavelength region of laser light changes as the temperature of a light emitting portion changes, mismatching may occur between the emission wavelength region of laser light and the transmission region of the filter depending on a use condition.

SUMMARY OF THE INVENTION

A first aspect of the invention is directed to an object detecting device. The object detecting device according to the first aspect includes an information acquiring section which acquires information relating to a targeted area by using light; and a detecting section which detects an object in the targeted area based on the information acquired by the information acquiring section. In this arrangement, the information acquiring section includes a light source which emits light in a predetermined wavelength region; a projection optical system which projects the light from the light source toward the targeted area; a light receiving element which receives reflected light reflected from the targeted area to output a signal; and a light receiving optical system which guides the reflected light to the light receiving element. The light receiving optical system has a filter for transmitting the light from the light source, and the filter is inclined toward a propagating direction of the reflected light to approximate a transmissive wavelength region of the filter to the wavelength region of the light from the light source.

In the object detecting device according to the first aspect, the information acquiring section may further include a filter actuator which changes the inclination of the filter with respect to the reflected light. In this case, the object detecting device may be configured to include a filter controlling section which controls the inclination of the filter via the filter actuator to optimize the signal from the light receiving element.

In the above arrangement, the expression "controls . . . to optimize the signal from the light receiving element" includes e.g. a method including detecting a temperature of the light source, predicting an optimum inclination (an inclination that optimizes the signal from the light receiving element) with respect to the detected temperature, and setting the filter at the optimum inclination, in addition to a method of controlling the inclination of the filter by directly monitoring the signal from the light receiving element.

A second aspect according to the invention is directed to an information acquiring device. The information acquiring device according to the second aspect has substantially the same arrangement as that of the information acquiring section according to the first aspect.

BRIEF DESCRIPTION OF THE DRAWINGS

These and other objects, and novel features of the present invention will become more apparent upon reading the following detailed description of the embodiment along with the accompanying drawings.

FIGS. 7A to 7C are diagrams showing an arrangement of an actuator in the second embodiment.

FIGS. 9A and 9B are diagram showing an arrangement of a light receiving portion of the information acquiring device in the second embodiment.

FIGS. 11A and 11B are diagrams showing an arrangement of a light receiving portion of the information acquiring device in the third embodiment.

Figure 1:
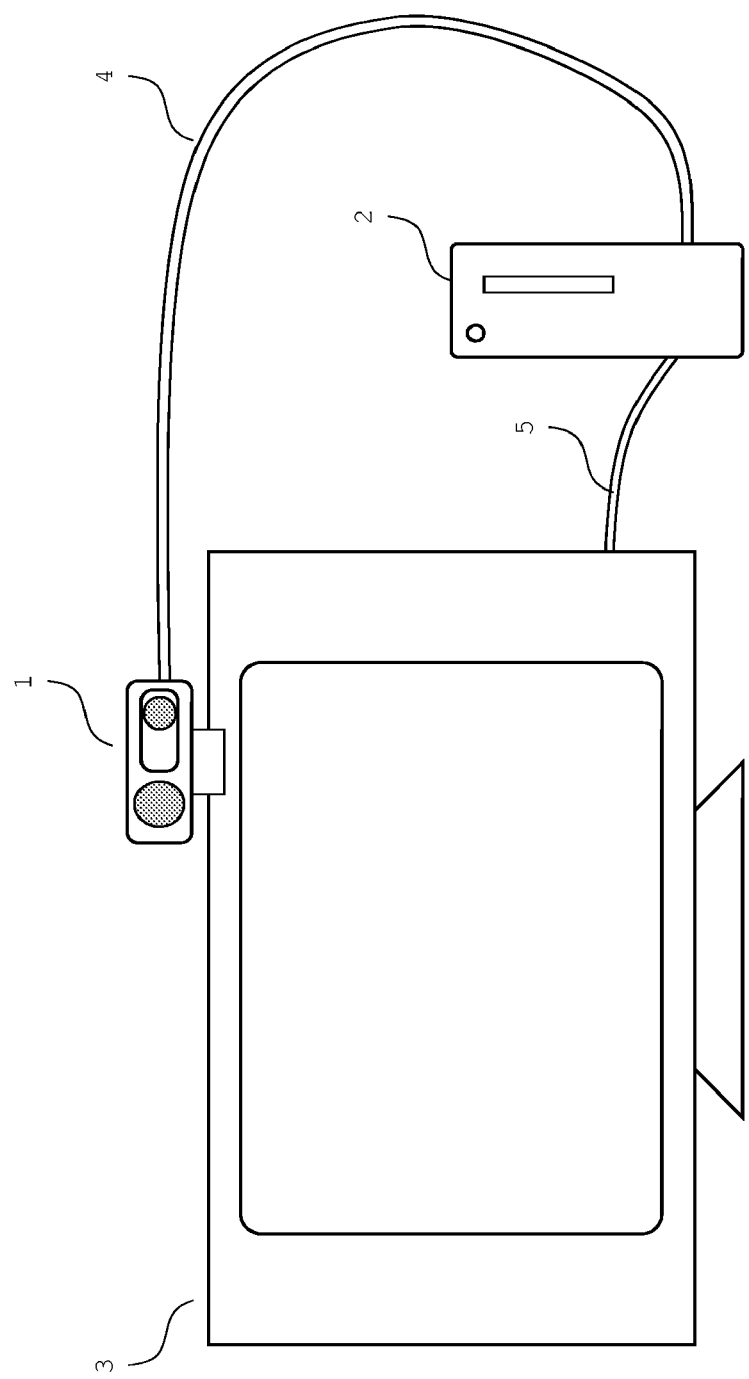
FIG. 1 is a diagram showing an arrangement of an object detecting device according to a first embodiment of the invention.

The drawings are provided mainly for describing the present invention, and do not limit the scope of the present invention.

DESCRIPTION OF PREFERRED EMBODIMENTS

In the following, embodiments of the invention are described referring to the drawings.

<First Embodiment>

Firstly, a schematic arrangement of an object detecting device according to the first embodiment is described. As shown in FIG. 1, the object detecting device is provided with an information acquiring device 1, and an information processing device 2. A TV 3 is controlled by a signal from the information processing device 2.

The information acquiring device 1 projects infrared light to the entirety of a targeted area, and receives reflected light from the targeted area by a CMOS image sensor to thereby acquire a distance (hereinafter, called as "three-dimensional distance information") to each part of an object in the targeted area. The acquired three-dimensional distance information is transmitted to the information processing device 2 through a cable 4.

The information processing device 2 is e.g. a controller for controlling a TV or a game machine, or a personal computer. The information processing device 2 detects an object in a targeted area based on three-dimensional distance information received from the information acquiring device 1, and controls the TV 3 based on a detection result.

For instance, the information processing device 2 detects a person based on received three-dimensional distance information, and detects a motion of the person based on a change in the three-dimensional distance information. For instance, in the case where the information processing device 2 is a controller for controlling a TV, the information processing device 2 is installed with an application program operable to detect a gesture of a user based on received three-dimensional distance information, and output a control signal to the TV 3 in accordance with the detected gesture. In this case, the user is allowed to control the TV 3 to execute a predetermined function such as switching the channel or turning up/down the volume by performing a certain gesture while watching the TV 3.

Further, for instance, in the case where the information processing device 2 is a game machine, the information processing device 2 is installed with an application program operable to detect a motion of a user based on received three-dimensional distance information, and operate a character on a TV screen in accordance with the detected motion to change the match status of a game. In this case, the user is allowed to play the game as if the user himself or herself is the character on the TV screen by performing a certain action while watching the TV 3.

Figure 2:
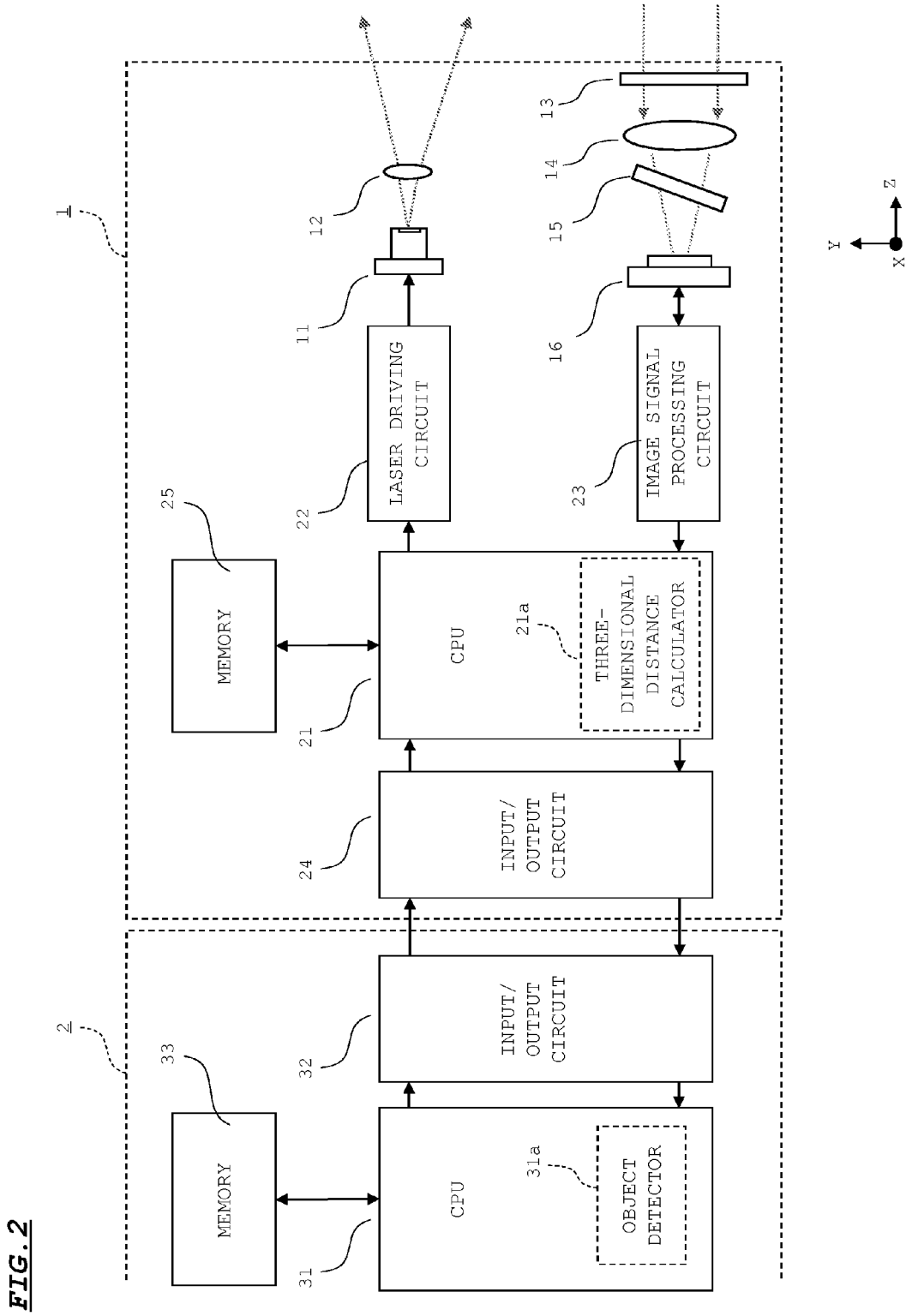
FIG. 2 is a diagram showing an arrangement of an information acquiring device and an information processing device in the first embodiment.

FIG. 2 is a diagram showing an arrangement of the information acquiring device 1 and the information processing device 2.

The information acquiring device 1 is provided with a laser light source 11, a projection lens 12, an aperture 13, an imaging lens 14, a filter 15, and a CMOS image sensor 16, which constitute an optical section. The information acquiring device 1 is further provided with a Central Processing Unit (CPU) 21, a laser driving circuit 22, an image signal processing circuit 23, an input/output circuit 24, and a memory 25, which constitute a circuit section.

The laser light source 11 outputs laser light in a narrow wavelength region of about 800 nm. The projection lens 12 enlarges the laser light emitted from the laser light source 11 so that the laser light is projected onto the entirety of the targeted area. Laser light reflected from the targeted area is entered into the imaging lens 14 through the aperture 13. The aperture 13 collimates external light so that the light satisfies F-number of the imaging lens 14. The imaging lens 14 collects the light entered through the aperture 13 on the CMOS image sensor 16.

The filter 15 is a band-pass filter which transmits light in a wavelength region substantially equal to the emission wavelength region of the laser light source 11, and blocks light in a wavelength region other than the emission wavelength region. The filter 15 is constituted of a dielectric film interference filter such as a Fabry-Perot filter. The filter 15 is disposed with an inclination of a predetermined angle in a direction in parallel to Y-Z plane with respect to a direction perpendicular to Z-axis in FIG. 2, which will be described later. The filter 15 has a parallel flat plate shape with a certain thickness.

The CMOS image sensor 16 receives light collected on the imaging lens 14, and outputs a signal (an electric charge) in accordance with a received light amount to the image signal processing circuit 23 pixel by pixel. Here, the CMOS image sensor 16 is configured such that the output speed of a signal is high so that a signal (an electric charge) from each pixel can be outputted to the image signal processing circuit 23 with a high response speed upon receiving light at each pixel.

The CPU 21 controls each of the parts of the image acquiring device 1 in accordance with a control program stored in the memory 25. By the control program, the CPU 21 has a function of a three-dimensional distance calculator 21a for generating three-dimensional distance information.

The laser driving circuit 22 drives the laser light source 11 in accordance with a control signal from the CPU 21. Here, the laser driving circuit 22 drives the laser light source 11 in accordance with a predetermined modulation system. By the driving, the laser light source 11 emits laser light having a modulation pattern inherent to the laser light source 11.

The image signal processing circuit 23 controls the CMOS image sensor 16 to successively accumulate a signal (an electric charge) from each pixel which has been generated in the CMOS image sensor 16 line by line. Then, the image signal processing circuit 23 successively outputs the accumulated electric charges to the CPU 21 as signals. The CPU 21 calculates a distance from the image acquiring device 1 to the position of each pixel, based on the signals supplied from the image signal processing circuit 23 by a processing of the three-dimensional distance calculator 21a. At the calculation, the CPU 21 determines whether the signal at each pixel position is modulated by the same modulation system as the modulation system of laser light by the laser driving circuit 22, and uses the signal at each pixel position for three-dimensional distance calculation only when the determination result is affirmative.

The input/output circuit 24 controls data communication with the information processing device 2.

The information processing device 2 is provided with a CPU 31, an input/output circuit 32, and a memory 33. The information processing device 2 is provided with e.g. an arrangement for communicating with the TV 3, or a drive device for reading information stored in an external memory such as a CD-ROM and installing the information in the memory 33, in addition to the arrangement shown in FIG. 2. The arrangements of the peripheral circuits are not shown in FIG. 2 to simplify the description.

The CPU 31 controls each of the parts of the information processing device 2 in accordance with a control program (application program) stored in the memory 33. By the control program, the CPU 31 has a function of an object detector 31a for detecting an object in an image. The control program is e.g. read from a CD-ROM by an unillustrated drive device, and is installed in the memory 33.

For instance, in the case where the control program is a game program, the object detector 31a detects a person and a motion thereof in an image based on three-dimensional distance information supplied from the information acquiring device 1. Then, the information processing device 2 causes the control program to execute a processing for operating a character on a TV screen in accordance with the detected motion.

Further, in the case where the control program is a program for controlling a function of the TV 3, the object detector 31a detects a person and a motion (gesture) thereof in the image based on three-dimensional distance information supplied from the information acquiring device 1. Then, the information processing device 2 causes the control program to execute a processing for controlling a predetermined function (such as switching the channel or adjusting the volume) of the TV 3 in accordance with the detected motion (gesture).

The input/output circuit 32 controls data communication with the information acquiring device 1.

Figure 3:
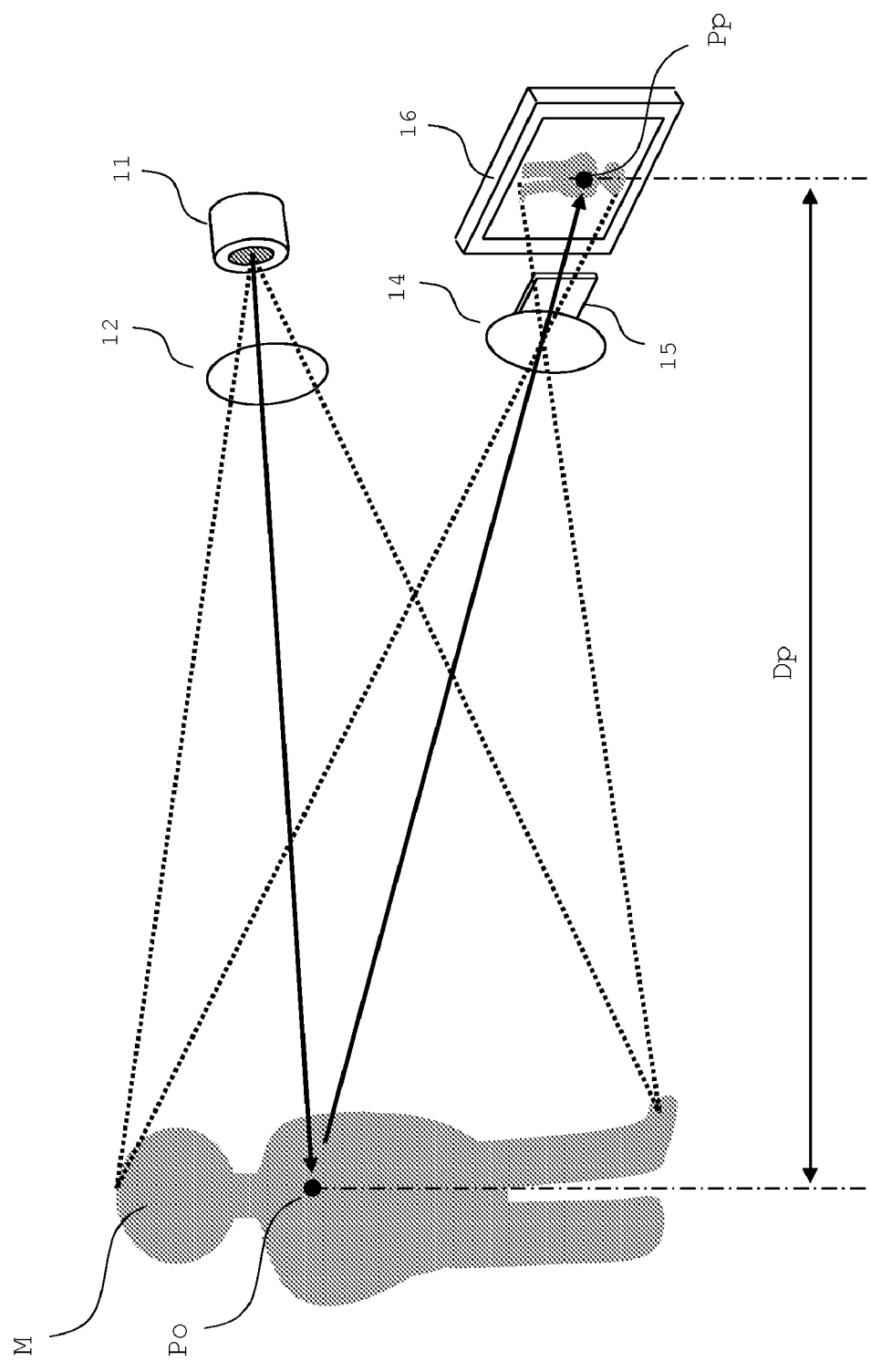
FIG. 3 is a diagram for describing a processing to be performed by a three-dimensional distance calculator in the first embodiment.

FIG. 3 is a diagram for describing a processing to be performed by the three-dimensional distance calculator 21a.

When an information acquiring processing by the information acquiring device 1 is activated in response to a command from the information processing device 2, laser light is projected to a targeted area from the laser light source 11 with a modulation pattern inherent to the laser light source 11. At the projection, if a person (M) exists in the targeted area as shown in FIG. 3, the laser light is reflected from the person (M), and is entered into the CMOS image sensor 16 through the imaging lens 14. Then, an image of the person (M) is captured by the CMOS image sensor 16.

At the image capturing, light that has impinged on a position Po of the person (M), out of the laser light from the laser light source 11, is entered into the position of a pixel Pp on the CMOS image sensor 16. Accordingly, assuming that $\Delta t$ is a time difference between a timing at which modulated laser light is emitted from the laser light source 11, and a timing at which the modulated laser light is received at the pixel Pp, a distance Dp from the information acquiring device 1 to the position Po of the person (M) is obtained by the equation (1).

$$Dp = C \times \Delta t \quad (C: \text{speed of light}) \tag{1}$$

The distance to each position of the person (M) other than the position Po is obtained in the same manner as described above.

The three-dimensional distance calculator 21a obtains the time difference $\Delta t$ in the equation (1) pixel by pixel, based on a time difference $\Delta T$ between a timing at which a command of emitting modulated laser light is issued to the laser driving circuit 22 and a timing at which a light receiving signal of modulated laser light at each pixel is inputted from the image signal processing circuit 23, and taking into account a time lag in each circuit of the circuit section, and responsiveness of the laser light source 11 and the CMOS image sensor 16; and performs the calculation (1) based on the obtained $\Delta t$ to acquire a distance from the information acquiring device 1 to each position of the person (M). At the calculation, if there is an object, a wall, or the like within the targeted area other than the person (M), the distance to these objects is obtained in the same manner as described above.

The three-dimensional distance calculator 21a outputs, to the information processing device 2, the thus obtained distance to each position of the object(s) within the targeted area, as three-dimensional distance information. In this case, for instance, if the person (M) moves his or her hand straight in forward or rearward direction, three-dimensional distance information which changes as the distance to the position of the hand changes is successively outputted to the information processing device 2. The object detector 31a of the information processing device 2 detects the person (M), and a motion of the person (M) of moving his or her hand in forward or rearward direction, based on a change in the received three-dimensional distance information. Then, the CPU 31 performs a control operation defined in the control program, based on a detection result.

Figure 4:
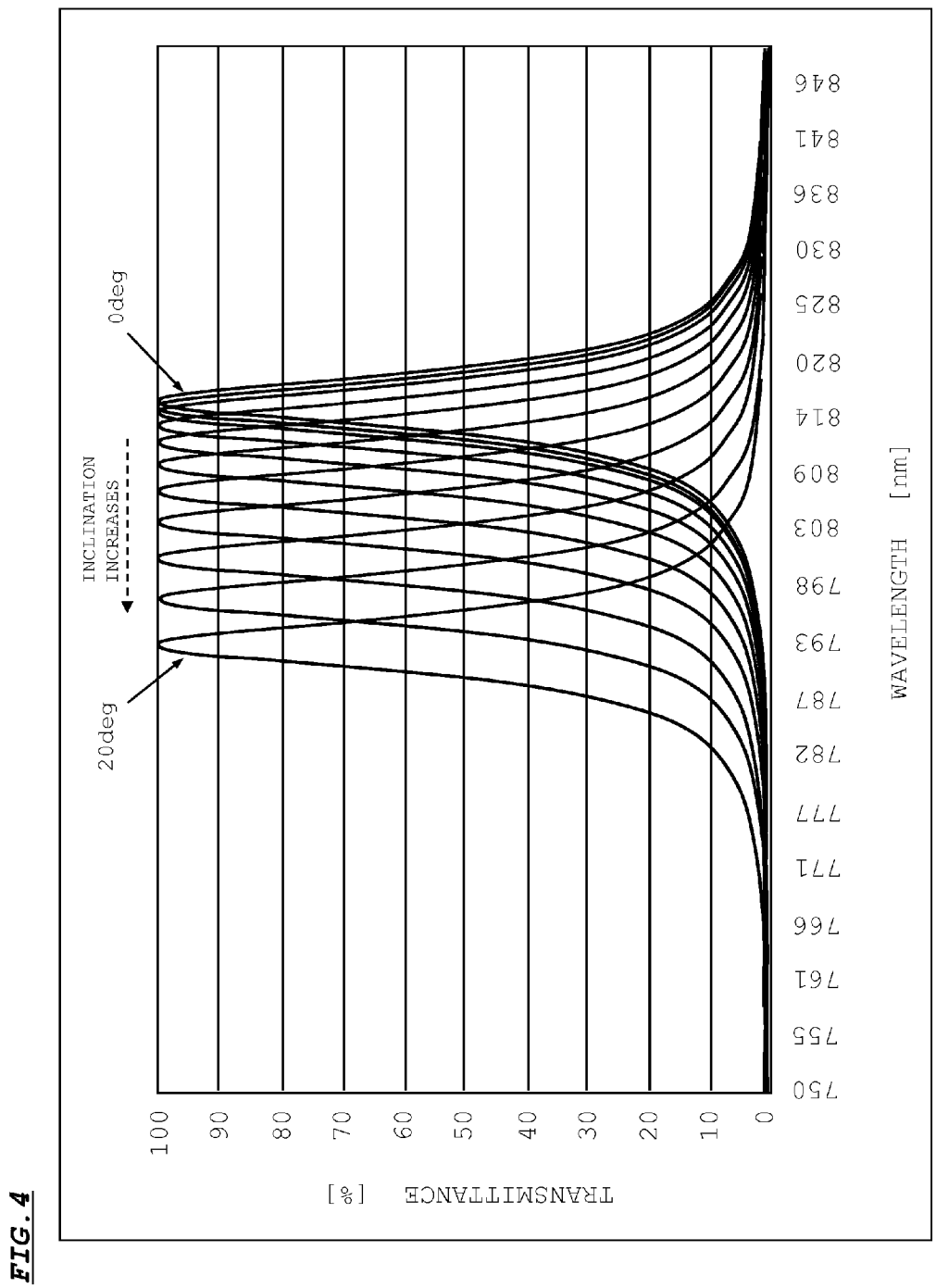
FIG. 4 is a diagram showing a relation between inclination angle and transmittance of a filter in the first embodiment.

Next, inclination adjustment of the filter 15 is described. FIG. 4 is a diagram (simulation result) showing a relation between transmittance and wavelength of light that propagates in Z-axis direction in FIG. 2, when the filter is inclined in a direction in parallel to Y-Z plane in FIG. 2. FIG. 4 shows eleven relation curves. In FIG. 4, the most rightward curve is a relation curve in the case where the filter is disposed perpendicularly to Z-axis in FIG. 2, and the most leftward curve is a relation curve in the case where the filter is inclined from a state perpendicular to Z-axis in FIG. 2 to a direction in parallel to Y-Z plane in FIG. 2 by 20 degrees. The inclination angle is incremented by 2 degrees, each time the curve is shifted leftward from the most rightward curve.

As shown in FIG. 4, the transmission region of the dielectric film interference filter can be changed by changing the inclination angle of the filter with respect to a light flux. Accordingly, in the arrangement of FIG. 2, in the case where the emission wavelength region of the laser light source 11 is deviated from an initial wavelength region, it is possible to properly guide modulated laser light from the targeted area to the CMOS image sensor 16 by adjusting the inclination of the filter 15 to such a direction as to approximate the transmission region of the filter 15 to the emission wavelength region of the laser light source 11.

As far as the inclination angle of the filter 15 is about 20 degrees, it is possible to change the transmission region of the filter 15 substantially in the same manner as described above, no matter in which direction the filter 15 may be inclined. In the arrangement of FIG. 2, the filter 15 is inclined in a direction in parallel to Y-Z plane. Alternatively, the filter 15 may be inclined in a direction in parallel to X-Z plane or may be inclined in a direction other than the above.

Figure 5B:
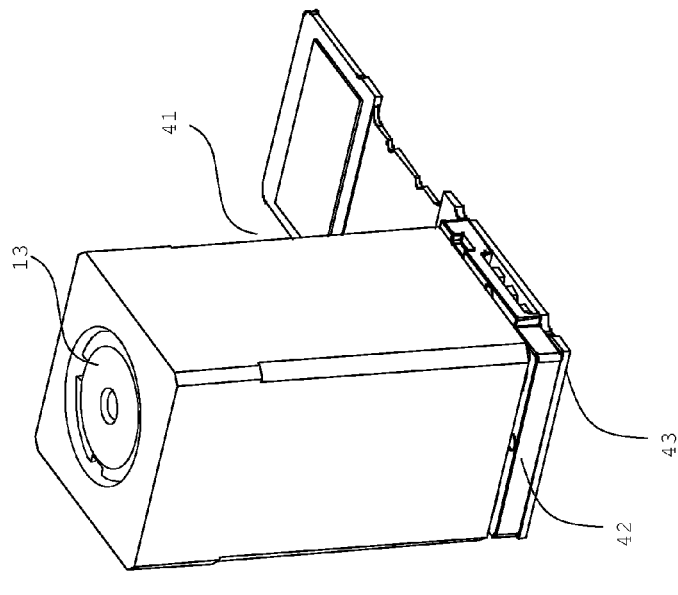
FIGS. 5A and 5B are diagrams showing an arrangement of a light receiving portion of the information acquiring device in the first embodiment.
Figure 5A:
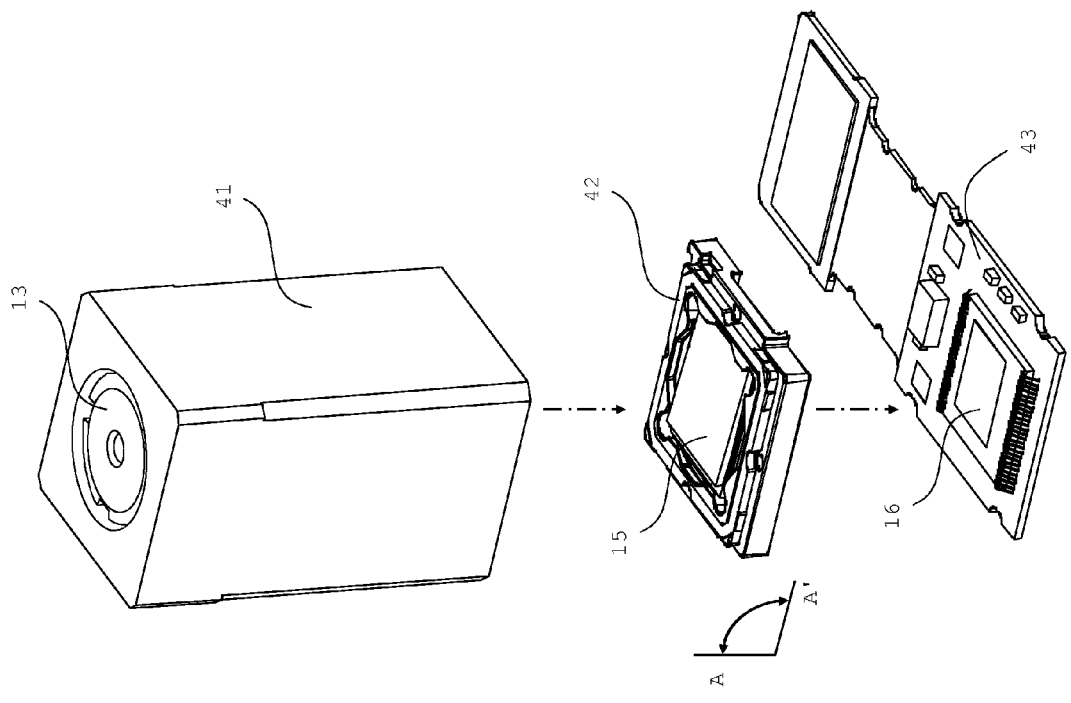

FIGS. 5A, 5B are diagrams showing a detailed arrangement of parts of the aperture 13, the imaging lens 14, the filter 15 and the CMOS image sensor 16.

In FIG. 5A, the reference numeral 41 denotes a holding block which holds the aperture 13 and the imaging lens 14. As shown in FIG. 5A, the holding block 41 has a hollow box-like shape with a bottom portion thereof being opened, and houses therein the imaging lens 14 constituted of plural lens groups. An upper portion of the holding block 41 is formed with a circular opening, and the aperture 13 is mounted in the upper portion of the holding block 41 in such a manner that the aperture 13 is exposed through the opening.

The reference numeral 42 denotes a holding frame which holds the filter 15. The holding frame 42 is formed with an opening in the middle thereof for passing light therethrough, and the filter 15 is mounted on an upper surface of the holding frame 42 in such a manner as to cover the opening. The upper surface of the holding frame 42 is formed with a step portion engageable with the filter 15. The step portion is inclined in a direction along A-A' plane (the direction of the arrows in FIG. 5A). Accordingly, when the filter 15 is mounted on the holding frame 42 with engagement with the step portion, the filter 15 is inclined in the direction along A-A' plane with respect to the holding frame 42.

The reference numeral 43 denotes a circuit board on which the CMOS image sensor 16 is mounted. Circuits relating to the CMOS image sensor 16 are mounted on the circuit board 43, in addition to the CMOS image sensor 16.

In assembling the parts, as shown in FIG. 5A, the holding frame 42 carrying the filter 15 is placed over the circuit board 43 in such a manner as to cover the CMOS image sensor 16. Then, the holding block 41 is mounted on the holding frame 42. FIG. 5B is a diagram showing a state that the holding block 41, the holding frame 42, and the circuit board 43 are assembled.

In this embodiment, plural holding frames 42 each having a step portion with a different inclination angle are prepared in advance. Then, one of the holding frames 42, which gives an inclination angle corresponding to a transmissive wavelength region n closest to the emission wavelength region of the laser light source 11, is selected from among the prepared holding frames 42, as the holding frame 42 for mounting the filter 15 thereon. Specifically, the laser light source 11 is turned on, and the wavelength region of laser light emitted from the laser light source 11 is measured by a measuring device. Then, one of the holding frames 42 that gives an inclination angle most suitable for the measured wavelength region is selected.

As described above, in this embodiment, since the transmissive wavelength region of the filter 15 can be approximated to the emission wavelength region of the laser light source 11, it is possible to properly guide reflected light from a targeted area to the CMOS image sensor 16. Specifically, even in the case where the emission wavelength region of the laser light source 11 is deviated from an initial wavelength region, it is possible to properly guide reflected light from a targeted area to the CMOS image sensor 16 by adjusting the inclination of the filter 15. Thus, this embodiment is advantageous in precisely obtaining three-dimensional distance information by the three-dimensional distance calculator 21a, and consequently, enhancing detection precision of the object detector 31a.

<Second Embodiment>

In the first embodiment, the inclination of the filter 15 is adjusted by selecting a holding frame 42 that gives an inclination most suitable for the emission wavelength region of the laser light source 11 from among the plural holding frames 42. In this embodiment, an actuator for changing an inclination state of a filter 15 is additionally provided, and the inclination of the filter 15 is adjusted by driving the actuator.

Figure 6:
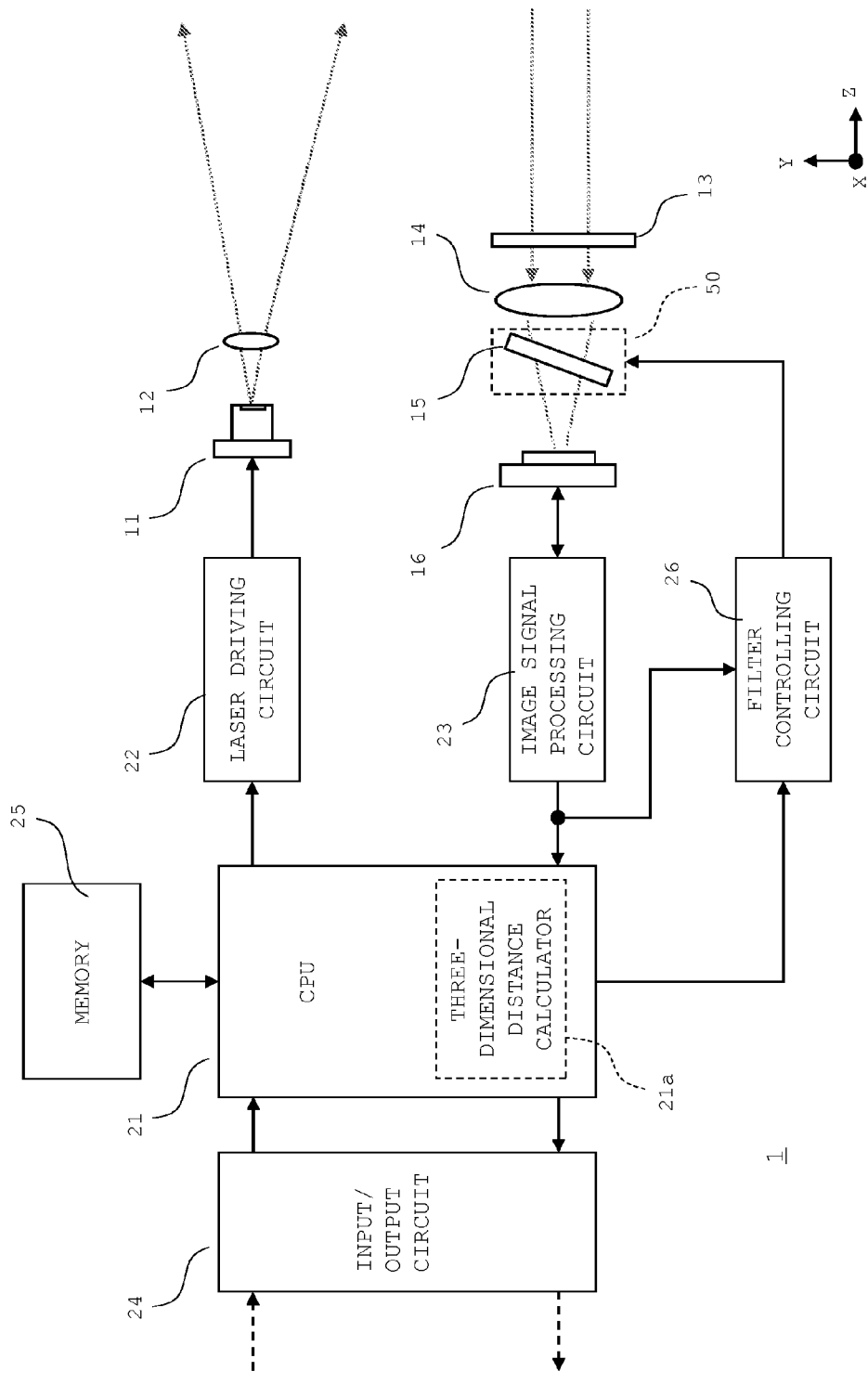
FIG. 6 is a diagram showing an arrangement of an information acquiring device according to a second embodiment of the invention.

FIG. 6 shows an arrangement of an information acquiring device 1 according to the second embodiment. In this embodiment, an actuator 50 for inclining the filter 15 in a direction in parallel to Y-Z plane, and a filter controlling circuit 26 for driving the actuator 50 are provided in addition to the arrangement shown in FIG. 2.

FIGS. 7A to 7C are diagrams showing an arrangement of the actuator 50. Referring to FIG. 7A, the actuator 50 is provided with a base 51, magnets 52a, 52b, a holder 53, a coil 54, and shafts 55, 56.

The base 51 is formed with wall portions 51a, 51c on left and right sides thereof, and the magnets 52a, 52b are respectively mounted in recess portions 51b, 51d formed inside of the wall portions 51a, 51c. Further, the wall portions 51a, 51c are respectively formed with shaft holes 51e, 51f, and the shafts 55, 56 with bottomed ends thereof are pivotally inserted in the shaft holes 51e, 51f. Further, a bottom portion of the base 51 is formed with an opening 51g for passing light therethrough.

The holder 53 is constituted of a frame member with an opening 53a in the middle thereof for passing light therethrough, and holes (not shown) engageable with the shafts 55, 56 are formed in left and right walls of the holder 53. The coil 54 is wound around the outer surface of the holder 53 in one direction in a state that the shafts 55, 56 are engaged in the holes. An upper surface of the holder 53 is formed with a step portion 53b, and the filter 15 is mounted in the holder 53 with engagement with the step portion 53b.

In assembling the parts, firstly, the magnets 52a, 52b are mounted in the recess portions 51b, 51d in such a manner as not to block the shaft holes 51e, 51f. Then, the shafts 55, 56 are disengaged from the holder 53, and the holder 53 is housed in a space between the wall portions 51a, 51c. Then, the shafts 55, 56 are engaged in the holes (not shown) of the holder 53, while being inserted in the shaft holes 51e, 51f. Thus, the assembling of the actuator 50 is completed.

FIG. 7B is a diagram showing a state that the actuator 50 is being assembled. In this state, the filter 15 is mounted in the holder 53 with engagement with the step portion 53b of the holder 53. FIG. 7C is a diagram showing a state that the filter 15 is mounted in the actuator 50.

Figure 8:
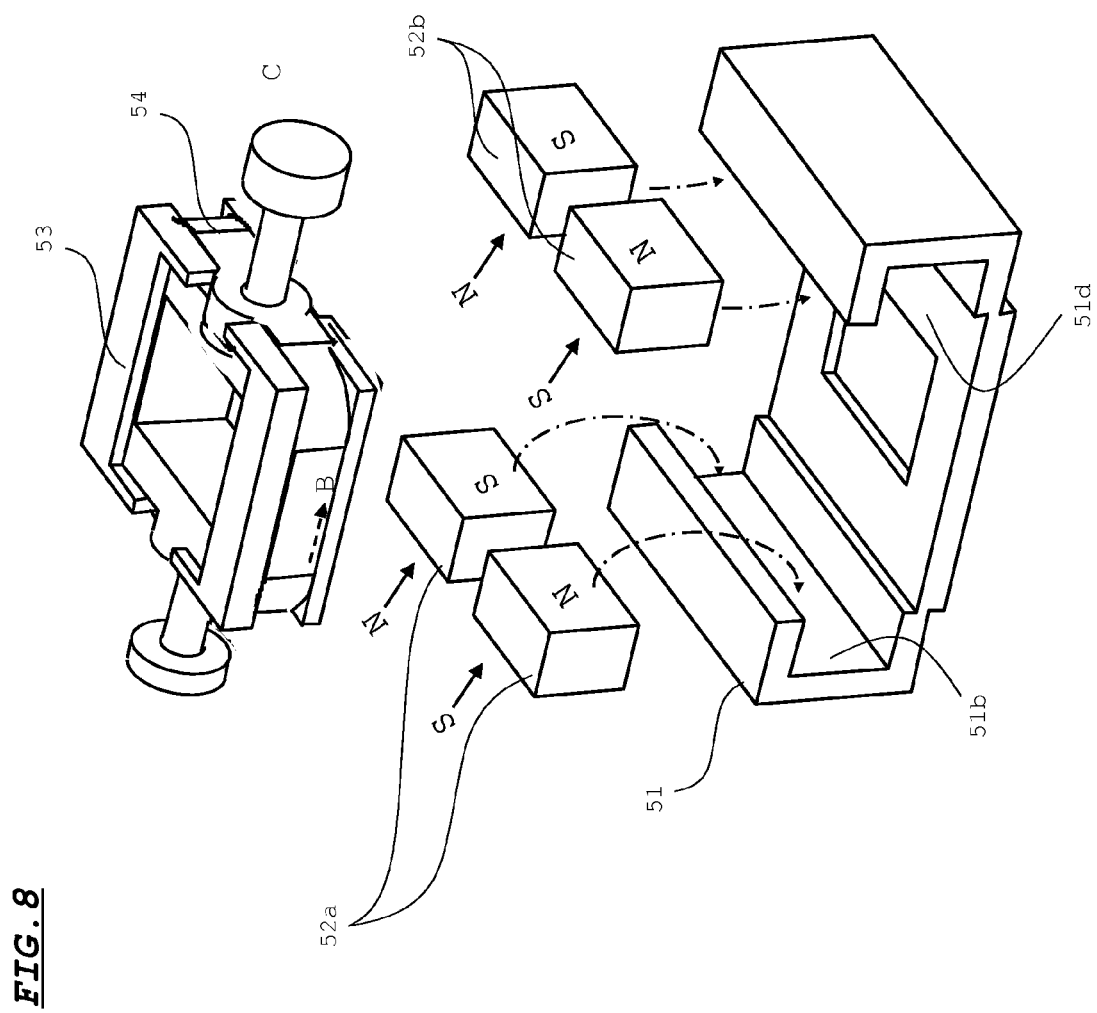
FIG. 8 is a diagram showing an arrangement of the actuator in the second embodiment.

FIG. 8 is a diagram showing polarities of the magnets 52a, 52b. The magnets 52a, 52b are mounted in the recess portions 51b, 51d with the polarities thereof as shown in the state of FIG. 8. In this arrangement, if a current flows in the coil 54 in the direction of the arrow B in FIG. 8, a force for pivotally moving the holder 53 in the direction of the arrow C is acted on the holder 53; and if a current flows in the coil 54 in the direction opposite to the arrow B, a force for pivotally moving the holder 53 in the direction opposite to the arrow C is acted on the holder 53. Accordingly, when a current flows in the coil 54 in the assembled state shown in FIG. 7C, the holder 53 is positioned at a rotary position where the force acting on the holder 53 by the current application, and the gravitational force are balanced, and the filter 15 is inclined with an inclination angle corresponding to the rotary position of the holder 53.

FIGS. 9A, 9B are diagrams showing a detailed arrangement of parts of an aperture 13, an imaging lens 14, the filter 15, the actuator 50, and a CMOS image sensor 16. Here, the actuator 50 is provided in addition to the arrangement shown in FIGS. 5A, 5B. Further, the filter 15 is mounted in the actuator 50, in place of being mounted in the holding frame 42.

In the above arrangement, as shown in FIG. 9A, a holding frame 42 is placed over a circuit board 43, and the actuator 50 carrying the filter 15 is placed over the holding frame 42. Then, a holding block 41 is mounted on the magnets 52a, 52b of the actuator 50. FIG. 9B is a diagram showing an assembled state of the information acquiring device 1.

Referring back to FIG. 6, in this embodiment, the filter controlling circuit 26 servo-controls the actuator 50 in such a manner that the total light amount of light corresponding to one image screen to be received by the CMOS image sensor 16 is maximum. Here, the total light amount is detected by summing up signals corresponding to one screen image to be outputted from the image signal processing circuit 23. By the servo-control, the filter 15 is inclined with an inclination most suitable for the emission wavelength region of the laser light source 11 concurrently for image capturing.

As described above, in this embodiment, it is possible to coincide the transmissive wavelength region of the filter 15 with the emission wavelength region of the laser light source 11, even in the case where the emission wavelength region of light from the laser light source 11 changes from time to time resulting from e.g. a change in the temperature of the laser light source 11 after turning on of the laser light source 11, as well as a case where the emission wavelength region of the laser light source 11 is deviated from an initial wavelength region. Thus, this embodiment is more advantageous in precisely obtaining three-dimensional distance information by a three-dimensional distance calculator 21a, and consequently enhancing detection precision of an object detector 31a.

In the arrangement example shown in FIGS. 7A to 9B, an actuator using a driving force by a coil and magnets is shown. Alternatively, it is possible to configure the information acquiring device 1 such that a driving force by a stepping motor is supplied to the holder 53 by omitting the coil 54 and the magnets 52a, 52b from the above arrangement, and by using one of the shafts 55, 56 as a gear.

<Third Embodiment>

In the arrangement of the second embodiment, refractive function of the filter 15 changes with respect to transmitted light, as the inclination of the filter 15 changes. Accordingly, the optical path of light that has been transmitted through the filter 15 changes in a direction in parallel to Y-axis in FIG. 6, as the inclination of the filter 15 changes, thereby changing the irradiation area of light on the CMOS image sensor 16 in the direction in parallel to Y-axis. If the irradiation area of light changes as described above, precision of three-dimensional distance information may be degraded, with the result that detection precision of the object detector 31a may be degraded. This embodiment has been made to solve the above drawback.

Figure 10:
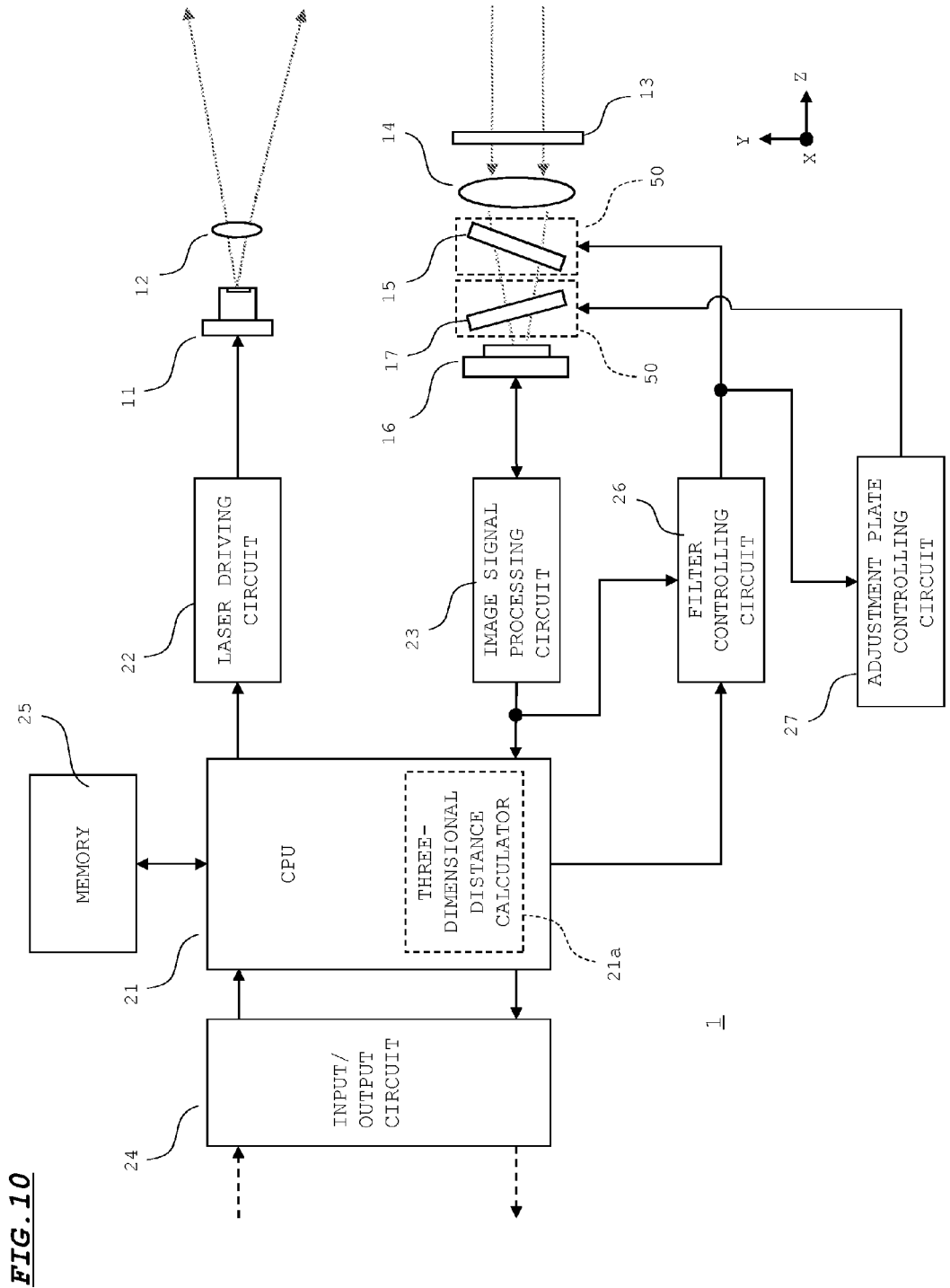
FIG. 10 is a diagram showing an arrangement of an information acquiring device according to a third embodiment of the invention.

FIG. 10 is a diagram showing an arrangement of an information acquiring device 1 according to the third embodiment. Here, an adjustment plate 17, an actuator 50 for driving the adjustment plate 17, and an adjustment plate controlling circuit 27 for controlling the driving of the adjustment plate 17 are provided, in addition to the arrangement shown in FIG. 6. The actuator 50 for driving the adjustment plate 17 is the same as the actuator 50 used in the second embodiment. Further, the adjustment plate 17 is constituted of a transparent plate having the same shape and the same refractive function as those of the filter 15.

FIGS. 11A, 11B are diagrams showing a detailed arrangement of parts of an aperture 13, an imaging lens 14, a filter 15, the adjustment plate 17, and a CMOS image sensor 16. Here, the adjustment plate 17, and the actuator 50 for driving the adjustment plate 17 are provided, in addition to the arrangement shown in FIGS. 9A, 9B. Further, the size of a holding block 41 in vertical direction is shorter than that of the holding block 41 in the foregoing embodiments by the size corresponding to the actuator 50 for the adjustment plate 17.

In the above arrangement, as shown in FIG. 11A, a holding frame 42 is placed over a circuit board 43, and the actuator 50 carrying the adjustment plate 17, and the actuator 50 carrying the filter 15 are placed one over the other in this order. Further, the holding block 41 is mounted on magnets 52a, 52b of the actuator 50. FIG. 11B is a diagram showing an assembled state.

Referring back to FIG. 10, the adjustment plate controlling circuit 27 supplies, from a filter controlling circuit 26, a current of a polarity opposite to the polarity of a current to be supplied to the actuator 50 for the filter 15, to the actuator 50 for the adjustment plate 17. By the current application, the adjustment plate 17 is inclined in a direction opposite to the inclination direction of the filter 15 by the same angle as the inclination angle of the filter 15. Accordingly, a shift in light flux in Y-axis direction resulting from an inclination of the filter 15 is cancelled by allowing light to pass through the adjustment plate 17. Thus, light is constantly guided to the same area on the CMOS image sensor 16.

Figure 12A:
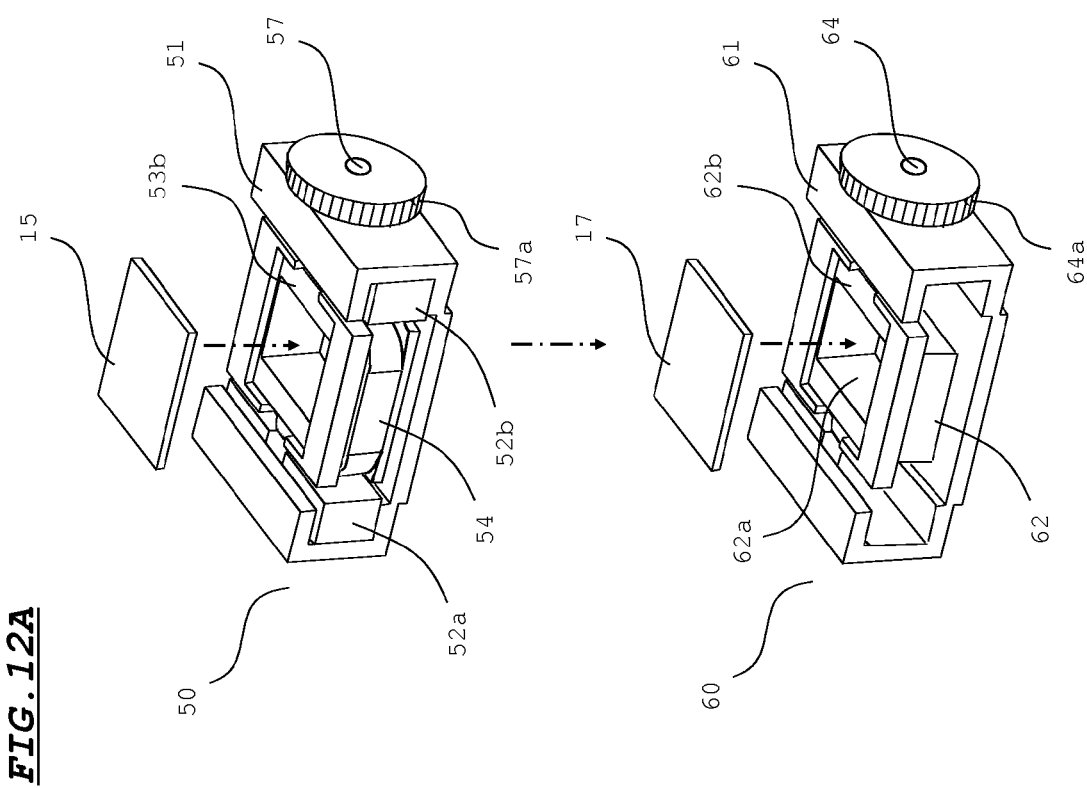
FIGS. 12A and 12B are diagrams showing a modification of the light receiving portion of the information acquiring device in the third embodiment.
Figure 12B:
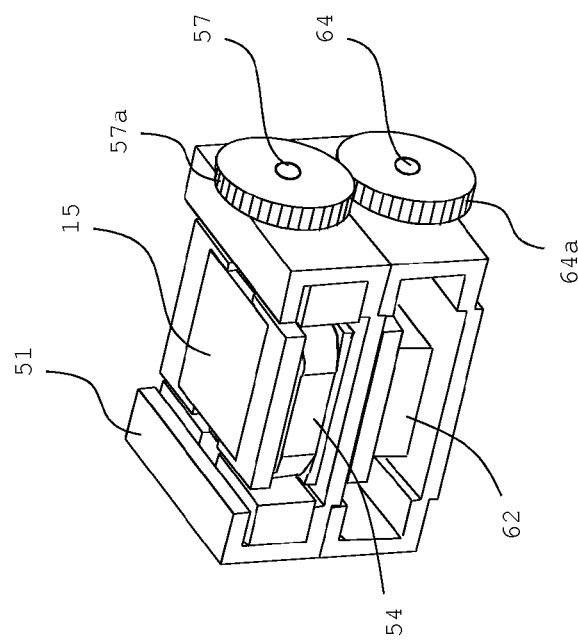

In this embodiment, the adjustment plate 17 and the filter 15 are individually driven. Alternatively, as shown in the arrangement of FIGS. 12A, 12B, it is possible to transmit a driving force of the actuator 50 to the side of the adjustment plate 17 by a gear mechanism. Here, a coil and magnets are not provided in an actuator 60 for the adjustment plate 17. Further, a gear 64a is mounted on a shaft 64 of the actuator 60, and a gear 57a is mounted on a shaft 57 of the actuator 50. The arrangement of the actuator 60 other than the above is the same as that of the actuator 50.

In the above arrangement, similarly to the case of FIGS. 11A, 11B, the actuator 50 is placed over the actuator 60. In the placement, as shown in FIG. 12B, the two gears 57a, 64a are meshed with each other. In the state of FIG. 12B, the filter 15 and the adjustment plate 17 are aligned in parallel to each other (horizontally). Accordingly, when the filter 15 is inclined by a predetermined angle upon application of a current to a coil 54, the adjustment plate 17 is inclined in the opposite direction by the same angle as the inclination angle of the filter 15.

In the above arrangement, it is also possible to drive the actuator by using a stepping motor. In this case, the actuator for driving the filter 15 has the same arrangement as that of the actuator 60, and a driving force of the stepping motor is applied to either one of the gears 57a, 64a.

<Fourth Embodiment>

Figure 13:
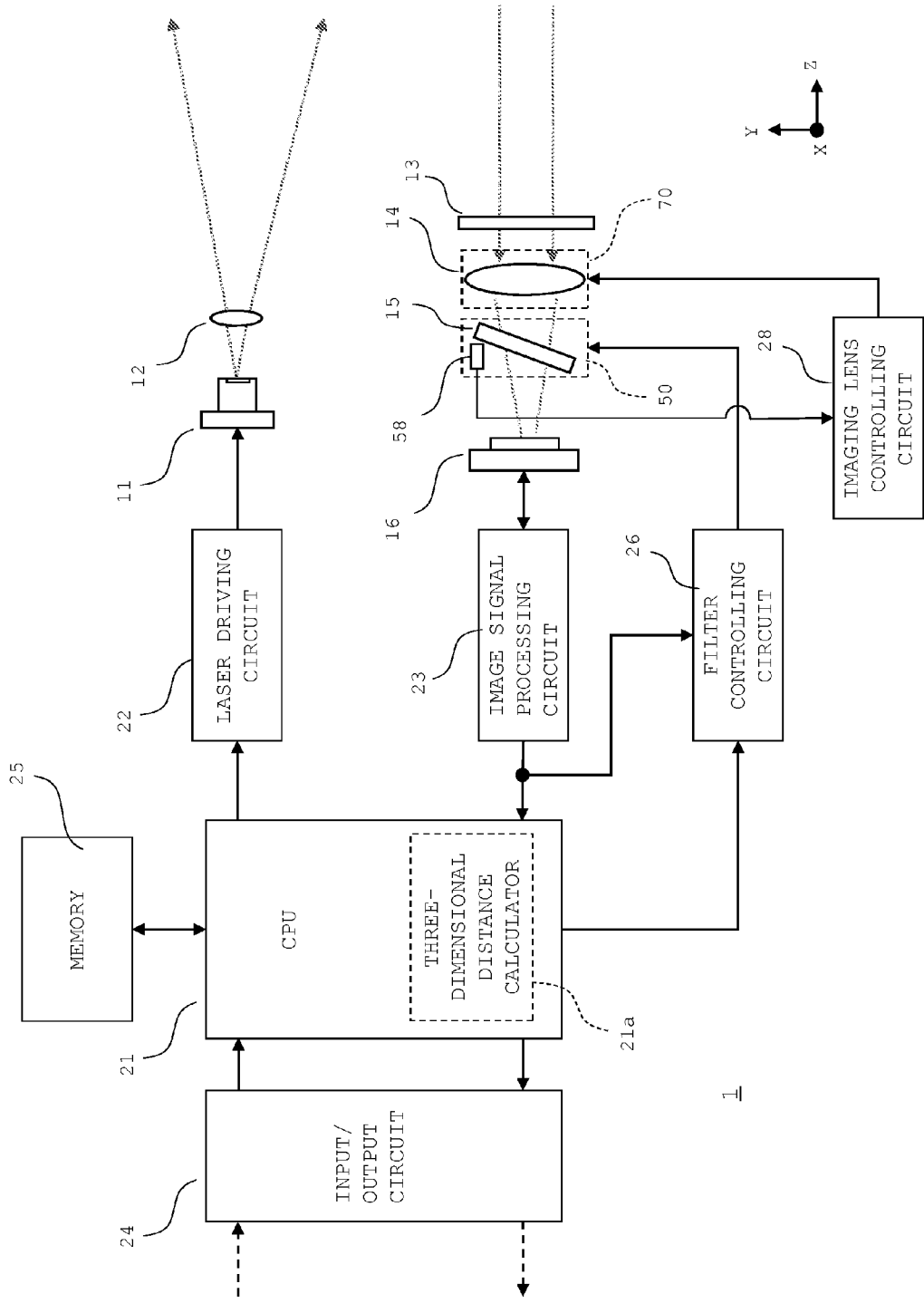
FIG. 13 is a diagram showing an arrangement of an information acquiring device according to a fourth embodiment of the invention.

In the third embodiment, variation in the irradiation area on the CMOS image sensor 16 resulting from a change in the inclination of the filter 15 is suppressed by using the adjustment plate 17. Alternatively, for instance, as shown in FIG. 13, it is possible to dispose an actuator 70 for displacing an imaging lens 14 in Y-axis direction in FIG. 13 so as to cancel a shift in light flux resulting from a change in the inclination of a filter 15 by displacing the imaging lens 14 in Y-axis direction.

In the above case, an actuator 50 may be provided with a sensor (such as a position sensor) 58 for detecting an inclination angle of the filter 15. An imaging lens controlling circuit 28 detects an inclination angle of the filter 15 based on a signal from the sensor 58, and supplies a drive signal corresponding to the detected inclination angle to the actuator 70. The actuator 70 may be constituted of e.g. a mechanism using a stepping motor or a piezoelectric element as a drive source.

Figure 14:
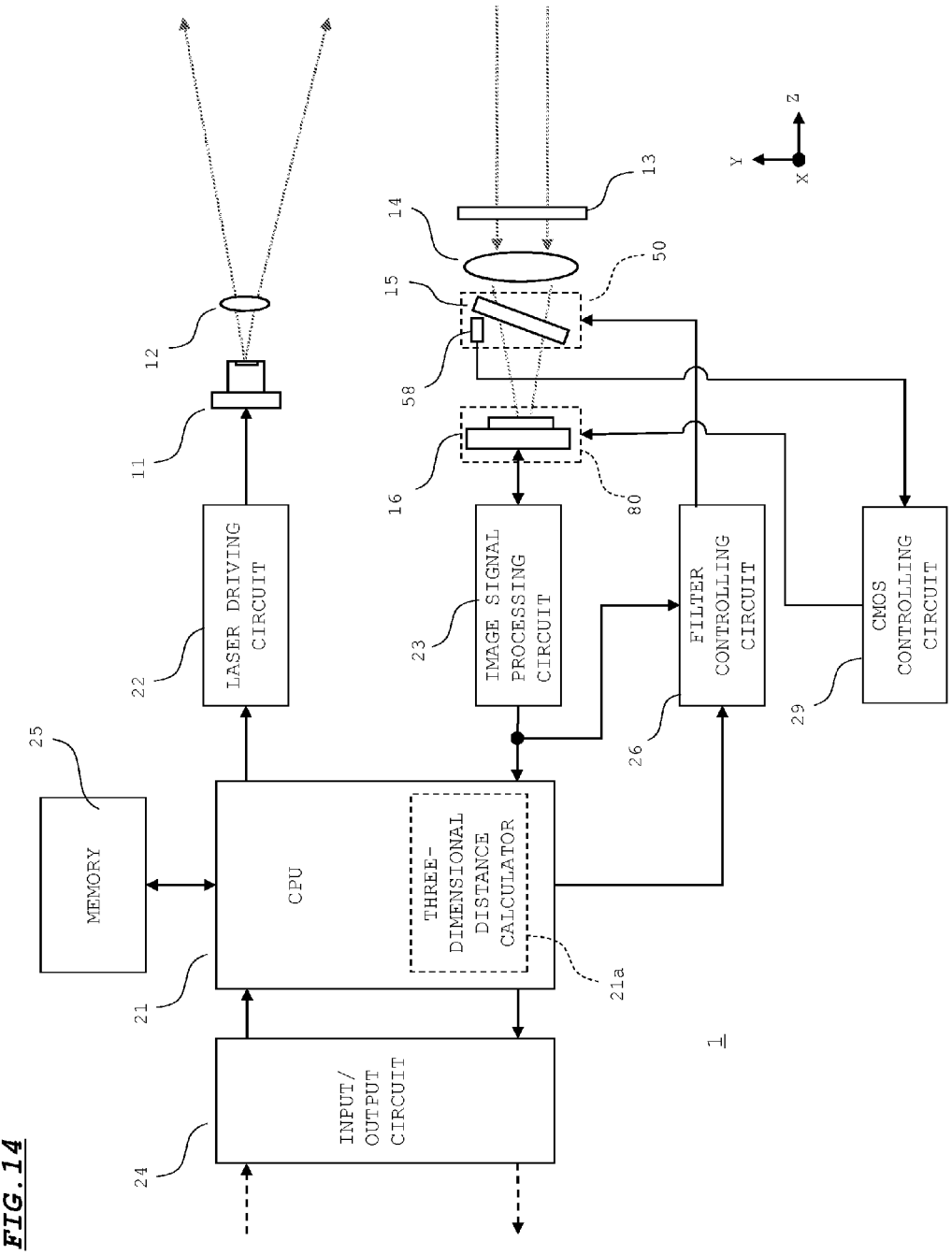
FIG. 14 is a diagram showing an arrangement of a modified information acquiring device in the fourth embodiment.

Further alternatively, as shown in FIG. 14, it is possible to dispose a driving section 80 for displacing the CMOS image sensor 16 in Y-axis direction in FIG. 14, and cause the CMOS image sensor 16 to follow a shift in light flux resulting from a change in the inclination of the filter 15 by displacing the CMOS image sensor 16 in Y-axis direction, in place of driving the imaging lens 14.

In the above case, the actuator 50 is also provided with the sensor (such as a position sensor) 58 for detecting an inclination angle of the filter 15. A CMOS controlling circuit 29 detects an inclination angle of the filter 15 based on a signal from the sensor 58, and supplies a drive signal corresponding to the detected inclination angle to the driving section 80. The driving section 80 may be constituted of e.g. a mechanism using a piezoelectric element as a drive source.

Figure 15:
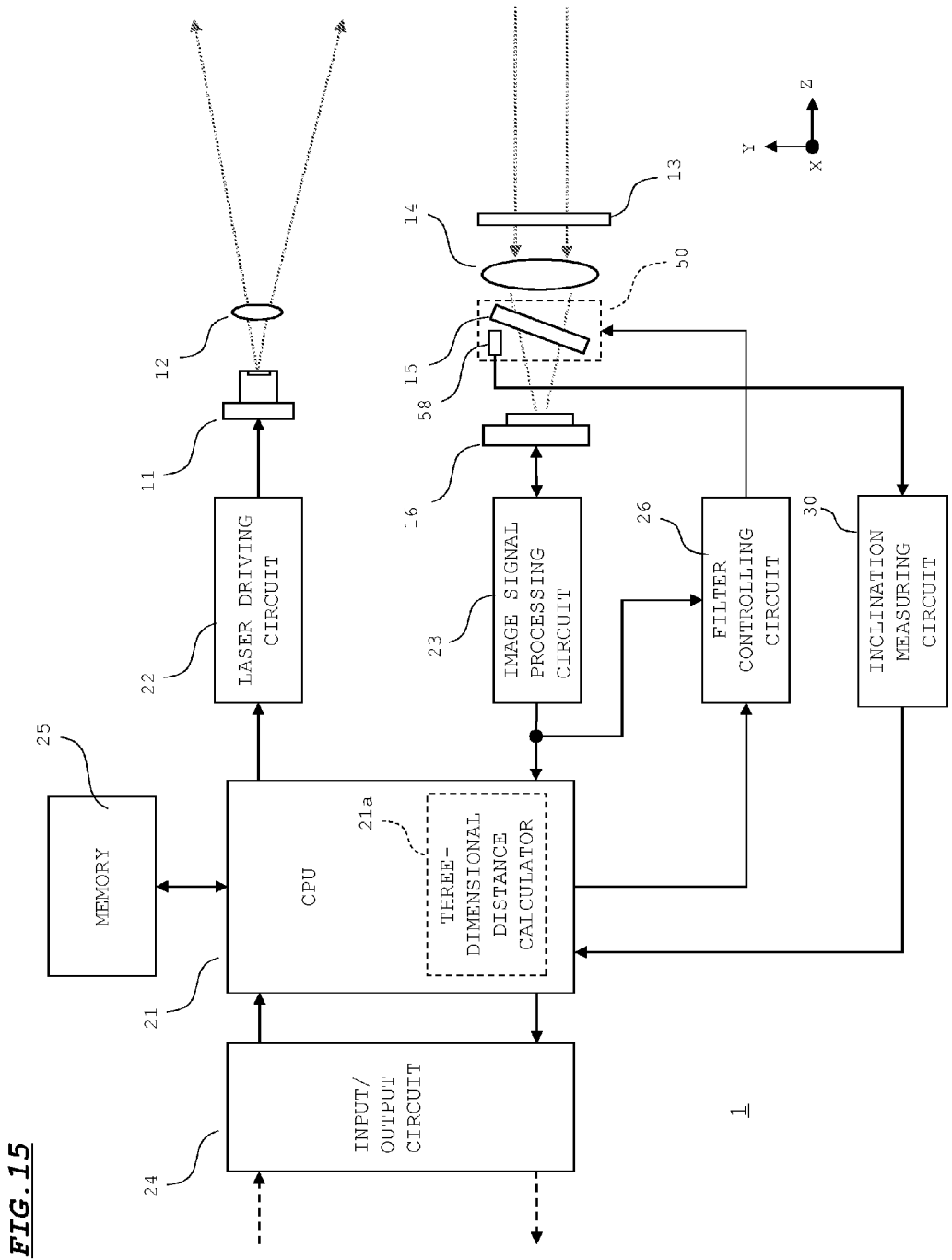
FIG. 15 is a diagram showing an arrangement of another modified information acquiring device in the fourth embodiment.

In the foregoing description, a shift in light flux resulting from a change in the inclination of the filter 15 is corrected by an arrangement of an optical section. Alternatively, for instance, as shown in FIG. 15, an influence resulting from a shift in light flux may be corrected by using a circuit arrangement.

In the above case, the actuator 50 may also be provided with the sensor (such as a position sensor) 58 for detecting an inclination angle of the filter 15. An inclination measuring circuit 30 measures an inclination angle of the filter 15 based on a signal from the sensor 58, and supplies the measured inclination angle to the CPU 21. The CPU 21 determines a displacement amount of an irradiation area on the CMOS image sensor 16 (a displacement amount of an irradiation area with respect to a state that the filter 15 is set perpendicular to Z-axis), based on the supplied inclination angle, and alters a distance between each pixel position and an object which has been obtained by computation into a distance to a pixel position away from the original pixel position by the number of pixels corresponding to the displacement amount of the irradiation area.

Figure 16:
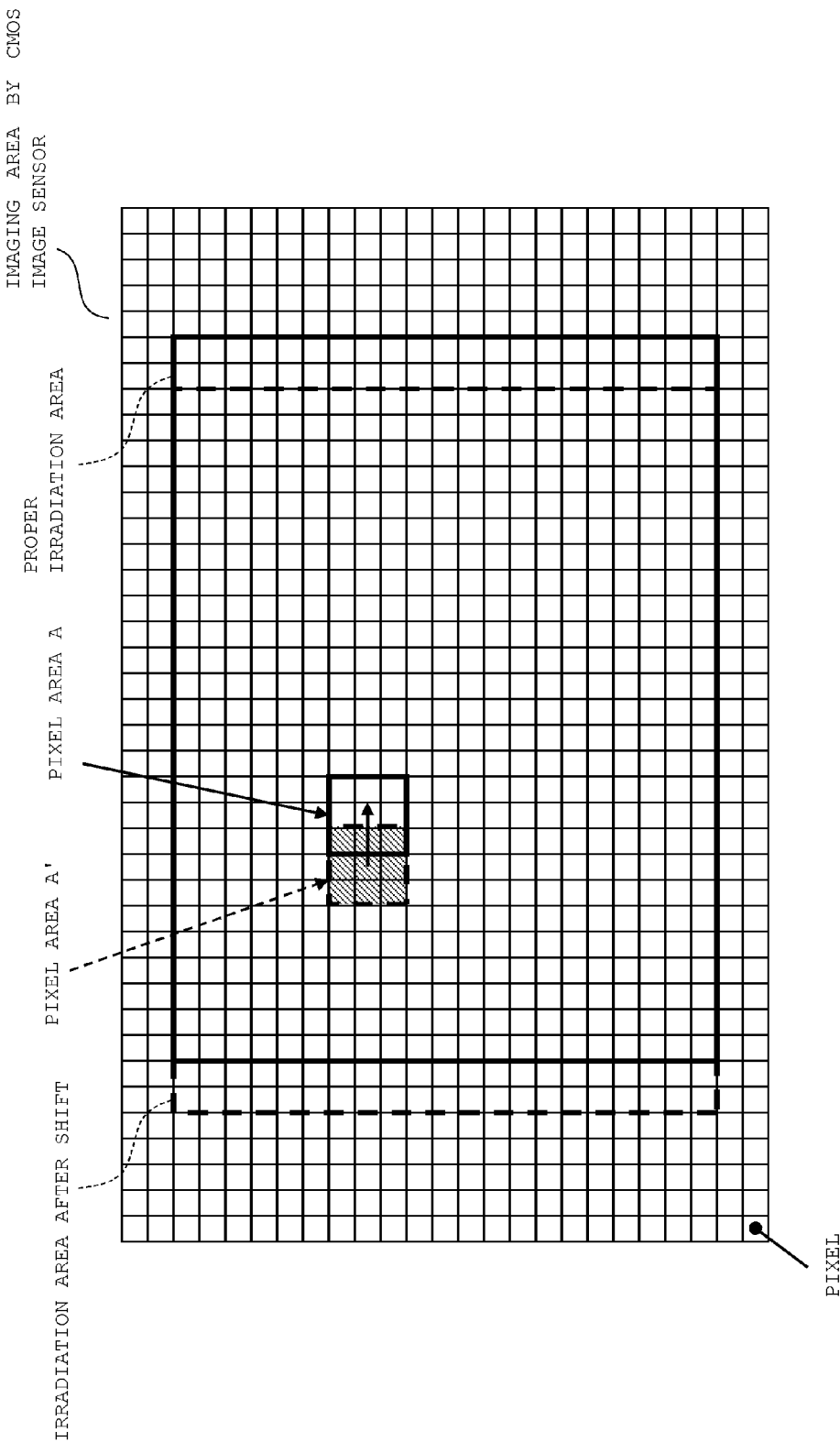
FIG. 16 is a diagram for describing a correction processing in the arrangement of FIG. 15.
Figure 17:
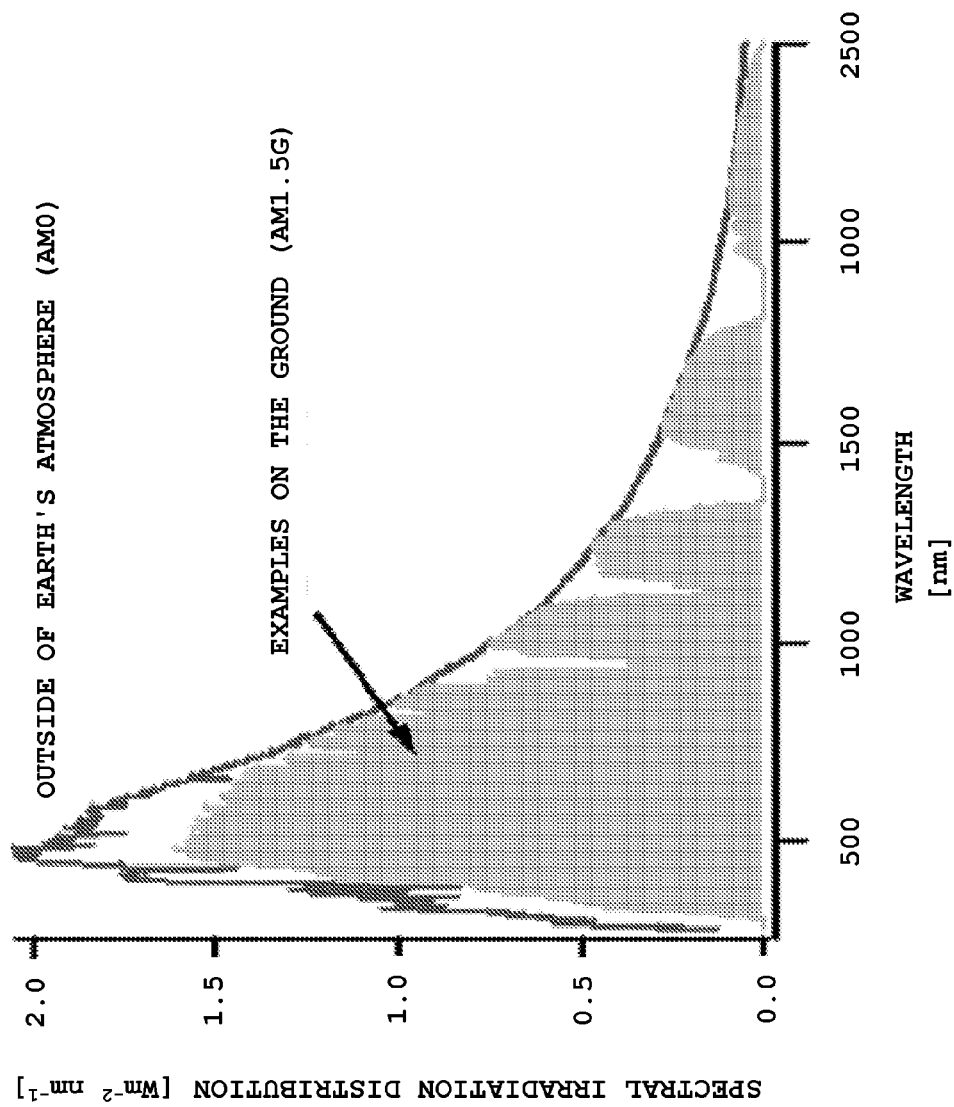
FIG. 17 is a diagram showing a wavelength spectrum of sunlight.

For instance, in the case where the irradiation area is displaced leftward from a proper irradiation area by two pixels, as shown in FIG. 16, the distance to the object which has been obtained in a pixel area A' is defined as a distance to each pixel position in a pixel area A which is displaced from the pixel area A by two pixels. By performing the above correction processing, it is possible to constantly acquire a distance to each pixel position in a proper irradiation area, even if the irradiation area of light on the CMOS image sensor 16 is shifted resulting from a change in the inclination of the filter 15.

<Use Examples of Object Detecting Device>

In the foregoing sections, there has been described an object detecting device constituted of the information acquiring device 1 and the information processing device 2. Since the inventive object detecting device is operable to three-dimensionally detect an object and a motion thereof, the inventive object detecting device may be used in various aspects, in addition to controlling a function of a TV or controlling a game machine by altering the control program (application program).

(1) The inventive object detecting device may be used for a security system. For instance, it is possible to detect a trespasser into a monitoring route by installing the information acquiring device 1 on the monitoring route from the outside, and activate an alert system upon detection of a trespasser. Further, installing the information acquiring device 1 at such a position that laser light is projected from above onto display goods or the like enables to detect a status of a space including the display goods. For instance, it is possible to detect a man's behavior of e.g. trying to reach the display goods by hand, and activate an alert system if such a behavior is detected.

(2) The inventive objective detecting device may be used for a walking robot. In this case, the information acquiring device 1 functions as the eyes of a robot, and is installed in such a manner as to project laser light onto a forward area of the robot. The robot detects a status (such as presence or absence of an object, and a motion of the object) in the forward area of the robot, based on three-dimensional distance information acquired by the information acquiring device 1.

(3) The inventive object detecting device may be used for counting the number of visitors. For instance, it is possible to detect persons coming in and out of an entrance of a facility by installing the information acquiring device 1 at such a position as to project laser light onto the entrance of the facility, thereby detecting the number of visitors who visited the facility.

(4) The inventive object detecting device may be used as a monitoring device for a Factory Automation (FA) system. For instance, installing the information acquiring device 1 at such a position that laser light is projected onto a hazardous area enables to detect a person or a body part of the person who is about to enter the hazardous area, and activate a safety device based on a detection result.

(5) The inventive object detecting device may be used for controlling a vehicle such as an automobile. For instance, installing the information acquiring device 1 at such a position as to project laser light onto a rearward area of an automobile enables to detect a distance to each position of an object in the rearward area of the automobile. Then, it is possible to activate a parking assist control device based on a detection result. Further, allowing the information acquiring device 1 to acquire three-dimensional distance information about a driver enables to detect a motion or a status of the driver. For instance, it is possible to control driving of the automobile or control operations of car-accessories (such as an audio equipment) by gestures of the driver. Furthermore, it is possible to detect the physical types of a driver and passenger(s) so as to e.g. automatically adjust the seat positions, or control the air injection amount, and the air injection speed of the respective airbags.

The embodiments of the invention have been described as above. The invention is not limited to the foregoing embodiments, and the embodiments of the invention may be changed or modified in various ways other than the above.

For instance, in the foregoing embodiments, laser light is enlarged and projected onto a targeted area. Alternatively, it is possible to configure the device such that a targeted area is scanned with laser light. In this case, it is possible to use a scan mechanism using a mirror (e.g. Japanese Unexamined Patent Publication No. 2008-102026), or a scan mechanism using a lens (e.g. Japanese Unexamined Patent Publication No. 2006-308558) as scanning means of laser light. Further alternatively, as far as a scanning position of laser light is detectable, a photodetector capable of detecting a received light amount may be used, in place of a CMOS image sensor.

Further, in the arrangement examples shown in FIGS. 6 to 14, the total received light amount of the CMOS image sensor 16 is monitored, and the inclination of the filter 15 is controlled to maximize the total received light amount. Alternatively, for instance, a temperature sensor for detecting a temperature of the laser light source 11 may be disposed to control the inclination angle of the filter, based on the detected temperature. In this case, the filter controlling circuit 26 stores a table which defines a relation between temperature and inclination angle (inclination angle which is supposed to be optimum at the corresponding temperature), and the inclination angle of the filter 15 is set by referring to the table. Alternatively, the table may define a correlation between temperature and current to be applied to the actuator 50 (coil 54). Further alternatively, in the case where the actuator 50 is driven by a stepping motor, the table may define a correlation between temperature, and the step number of the stepping motor from a neutral position. In this case, it is necessary to provide the actuator 50 with an additional arrangement for detecting the neutral position such as detection means constituted of magnets and a hall element.

Further, in the arrangement examples shown in FIGS. 6 to 14, the inclination angle of the filter 15 is dynamically controlled in a whole period when the information acquiring device 1 is activated. Alternatively, the inclination angle of the filter 15 may be adjusted at a point of time when the information acquiring device 1 is started up, and thereafter, for a predetermined period or each time when an increase in the temperature of the laser light source 11 exceeds a predetermined temperature range. In this case, it is desirable to use a stepping motor as a drive source for the actuator 50. In the case where a stepping motor is used as a drive source, the filter controlling circuit 26 controls the filter 15 to pivotally move in a predetermined angle range (which is defined by the step number of the stepping motor) from a neutral position at a timing when the inclination angle is adjusted, and acquires the total received light amount by the CMOS image sensor 16 at each angle position. Then, the filter controlling circuit 26 controls the filter 15 to incline from the neutral position by an angle (step number) which gives a maximum received light amount out of all the acquired total received light amounts. In this case, it is also necessary to provide the actuator 50 with an additional arrangement for detecting the neutral position, such as detection means constituted of magnets and a hall element.

Further, in the arrangement example shown in FIG. 10, the optical path is corrected by inclining the adjustment plate 17 in the direction opposite to the inclination direction of the filter 15. Alternatively, it is possible to use other optical path correction element such as a diffraction element which changes a diffraction function by a control signal. Furthermore, in the foregoing embodiments, a laser light source is used as a light source. Alternatively, a narrow-band LED may be used in place of the laser light source. Furthermore, a CCD image sensor having high responsiveness may be used in place of the CMOS image sensor 16. In addition, the information acquiring device 1 and the information processing device 2 may be integrally configured.

The embodiments of the invention may be changed or modified in various ways as necessary, as far as such changes and modifications do not depart from the scope of the claims of the invention hereinafter defined.

What is claimed is:

1. An object detecting device, comprising:
   an information acquiring section which acquires information relating to a targeted area by using light; and
   a detecting section which detects an object in the targeted area based on the information acquired by the information acquiring section,
   the information acquiring section including:
      a light source which emits light in a predetermined wavelength region;
      a projection optical system which projects the light from the light source toward the targeted area;
      a light receiving element which receives reflected light reflected from the targeted area to output a signal; and
      a light receiving optical system which guides the reflected light to the light receiving element, wherein
      the light receiving optical system has a filter for transmitting the light emitted from the light source and reflected from the target area, and
      the filter is inclined toward a propagating direction of the reflected light to approximate a transmissive wavelength region of the filter to the wavelength region of the light from the light source, wherein
      the information acquiring section further includes
      a filter actuator which changes the inclination of the filter with respect to the reflected light, and
      a filter controlling section which controls the inclination of the filter via the filter actuator to optimize the signal from the light receiving element based on the signal outputted from the light receiving element.

2. The object detecting device according to claim 1, wherein
   the information acquiring section further includes a compensating section which compensates for positional displacement of the reflected light on the light receiving element resulting from a change in an optical path of the reflected light depending on a change in the inclination of the filter.

3. The object detecting device according to claim 2, wherein
   the compensating section includes:
   an optical member for correcting the change in the optical path of the reflected light; and
   a member driving section which drives the optical member depending on the inclination of the filter.

4. An information acquiring device, comprising:
   a light source which emits light in a predetermined wavelength region;
   a projection optical system which projects the light from the light source toward a targeted area;
   a light receiving element which receives reflected light reflected from the targeted area to output a signal; and
   a light receiving optical system which guides the reflected light to the light receiving element, wherein
   the light receiving optical system has a filter for transmitting the light emitted from the light source and reflected from the target area, and
   the filter is inclined toward a propagating direction of the reflected light to approximate a transmissive wavelength region of the filter to the wavelength region of the light from the light source, wherein
   the information acquiring section further includes
   a filter actuator which changes the inclination of the filter with respect to the reflected light, and
   a filter controlling section which controls the inclination of the filter via the filter actuator to optimize the signal from the light receiving element based on the signal outputted from the light receiving element.

5. The information acquiring device according to claim 4, further comprising
   a compensating section which compensates for positional displacement of the reflected light on the light receiving element resulting from a change in an optical path of the reflected light depending on a change in the inclination of the filter.

6. The information acquiring device according to claim 5, wherein
   the compensating section includes:
   an optical member for correcting the change in the optical path of the reflected light; and
   a member driving section which drives the optical member depending on the inclination of the filter.

* * * * *